US006821438B2

(12) United States Patent
Hadley et al.

(10) Patent No.: US 6,821,438 B2
(45) Date of Patent: Nov. 23, 2004

(54) APPARATUS AND METHOD FOR INCREASING OXYGEN LEVELS IN A LIQUID

(75) Inventors: Darrell J. Hadley, Oklahoma City, OK (US); Jeffrey D. Hadley, Edmond, OK (US); William R. Rey, Oklahoma City, OK (US); Geir O. Eriksen, Sellenbakk (NO)

(73) Assignee: Geir Corporation, Edmond, OK (US)

( * ) Notice: Subject to any disclaimer, the term of this patent is extended or adjusted under 35 U.S.C. 154(b) by 0 days.

(21) Appl. No.: 10/381,623

(22) PCT Filed: Sep. 27, 2001

(86) PCT No.: PCT/US01/30145

§ 371 (c)(1), (2), (4) Date: Jul. 10, 2003

(87) PCT Pub. No.: WO02/26367

PCT Pub. Date: Apr. 4, 2002

(65) Prior Publication Data

US 2004/0004042 A1 Jan. 8, 2004

Related U.S. Application Data

(60) Provisional application No. 60/235,740, filed on Sep. 27, 2000.

(51) Int. Cl.[7] ............................... C02F 1/48; C02F 1/72

(52) U.S. Cl. .................... 210/695; 210/758; 210/198.1; 426/67

(58) Field of Search ................................ 210/695, 758, 210/198.1; 426/67

(56) References Cited

U.S. PATENT DOCUMENTS 4,639,340 A 1/1987 Garrett
4,645,603 A 2/1987 Frankl
4,761,228 A 8/1988 Weisenbarger et al.
5,302,325 A 4/1994 Cheng
5,616,250 A 4/1997 Johnson et al.
5,814,222 A * 9/1998 Zelenak et al. ............. 210/615
5,885,467 A * 3/1999 Zelenak et al. ............. 210/758
5,904,851 A * 5/1999 Taylor et al. ............... 210/620
5,925,292 A 7/1999 Ziesenis
6,120,008 A 9/2000 Littman et al.
6,250,609 B1 6/2001 Cheng et al.

* cited by examiner

*Primary Examiner*—Betsey Morrison Hoey
(74) *Attorney, Agent, or Firm*—Fellers, Snider, et al.

(57) ABSTRACT

Apparatus and method for increasing dissolved oxygen levels in a liquid. An oxygenation system (100) includes a liquid source (102) from which liquid is introduced into a piping network (106) by a pump (104). Colloidal minerals are injected into the liquid in a dwell chamber (110). The mixture of liquid and minerals flows into an oxygenator (118) where gaseous oxygen is injected into the liquid. The resulting two-phase flow stream is accelerated to supersonic speeds through a linear flow accelerator (126) comprising a flat Venturi (130) and electromagnets (128) positioned adjacent the flat Venturi. The electromagnets generate an electromagnetic field to exert a force on the two-phase mixture in the direction of the flow. The flow stream then passes through a laminar flow grid (132) to remove turbulence, after which the oxygenated liquid is bottled at a bottling system (134).

10 Claims, 3 Drawing Sheets

102
116
CONTROL
106
104
108
OZONATOR
110
DWELL CHAMBER
114
112
MINERALS
120
$O_2$
118
OXYGENATOR
122
124
126
128
132
130
128
134
135
138
136
BOTTLING SYSTEM
100

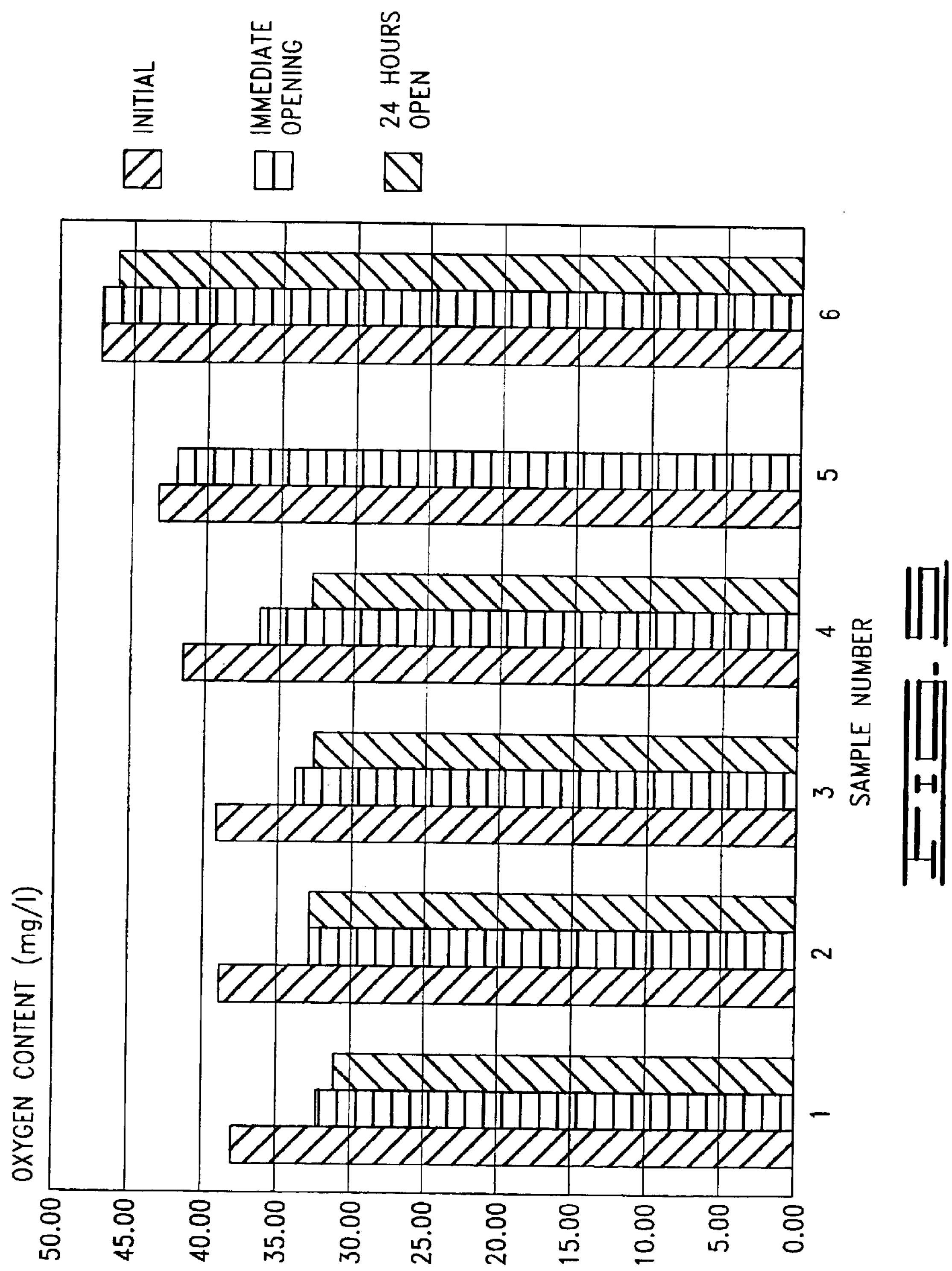
INITIAL
IMMEDIATE OPENING
24 HOURS OPEN
OXYGEN CONTENT (mg/l)
50.00
45.00
40.00
35.00
30.00
25.00
20.00
15.00
10.00
5.00
0.00
1
2
3
4
5
6
SAMPLE NUMBER

APPARATUS AND METHOD FOR INCREASING OXYGEN LEVELS IN A LIQUID

This application claims the benefit of provisional application No. 60/235,740 filed Sep. 27, 2000.

FIELD OF THE INVENTION

The invention generally relates to fluid processing systems and more particularly to an apparatus and method for increasing the level of dissolved oxygen in a fluid.

BACKGROUND OF THE INVENTION

Oxygen enriched beverages have become more popular in recent years. Oxygenated sports drinks (including water) have sought to enhance athletic performance by increasing oxygen levels in the bloodstream of the consumer. Researchers are continuing to discover other non-athletic, physiological benefits of oxygenated beverages.

At standard temperature and pressure, oxygen exists in a gaseous state. Oxygen ($O_2$) normally makes up about 21% of the air in the atmosphere. If oxygen is mixed with a liquid in an open container, the oxygen will migrate to the atmosphere when the mixture is at equilibrium. To preserve the oxygen content of the mixture, the mixture must be sealed before the oxygen migrates to the atmosphere.

There are various ways to transfer mass from a gas into a liquid. A first way is to provide a large liquid-gas boundary area through which gas may be absorbed into the liquid. A second way is to provide a driving force between the gas and liquid phases. The magnitude of the driving force directly correlates with the mass transfer rate. A third way is to increase the mass transfer coefficient by increasing the relative velocity between the interfacing gas and liquid phases, and to increase the turbulent mixing in the liquid phase.

There have been various patents issued for systems and methods for oxygenating liquids. For example, U.S. Pat. No. 6,120,008 issued to Littman et al. (Littman '008) teaches a process for enriching a liquid with oxygen. The Littman '008 process includes flowing the liquid through a pipe and injecting gaseous oxygen into the liquid. The mixture is then flowed through a nozzle to accelerate the flow to supersonic speeds. In returning to subsonic speeds, a shock wave is formed in the flow. The shock wave breaks up the bubbles of oxygen formed in the liquid. In creating the microscopic bubbles, the liquid-gas boundary surface area greatly increases and enhances the process of transferring mass from the gas into the liquid.

U.S. Pat. No. 6,250,609 issued to Cheng et al. (Cheng '609) teaches a process for producing oxygenated liquid. Cheng '609 also teaches to mix ozone ($O_3$) with the liquid prior to mixing the oxygen ($O_2$) with the liquid. The ozone acts to destroy bacteria and remove the odor and harmful organic compounds that may be in the liquid.

U.S. Pat. No. 5,925,292 issued to Zeisenis (Zeisenis '292) teaches a process where oxygen is injected into a liquid. The liquid is moved downwardly through a vertically extending outer vortex and then back upwardly through a vertically extending inner vortex, and oxygen is introduced upstream or at the point of reversal. Zeisenis '292 further teaches the oxygenated liquid to a magnetic field to induce a substantial Zeta potential. The Zeta potential, or electrokinetic potential, is a measure of a dispersion stability of charged particles in solution.

Although prior art systems may be found operable in producing oxygenated liquids, there remains a need for improvements to increase the oxygen concentration in oxygenated liquid and to increase the retention rates of oxygen within the liquid over time.

SUMMARY OF THE INVENTION

The present invention is directed to an apparatus and method for increasing dissolved oxygen levels in a liquid.

In accordance with preferred embodiments, an oxygenation system includes a piping network, a pump or other pressure source to circulate the liquid through the piping network to create a flow stream, and a liquid source to provide the liquid to the piping network. Liquid passing through the piping network discharges from the pump and passes to an ozonator connected to the piping network for injecting gaseous ozone into the liquid. Colloidal minerals are injected into the liquid in a dwell chamber at a desired concentration.

The mixture of liquid and minerals flows into an oxygen injector connected to the piping network which injects gaseous oxygen into the liquid to form a two-phase flow stream. The mixture passes through a dispersal grid to more uniformly distribute the bubbles in the flow stream.

The two-phase flow stream is accelerated to supersonic speeds by a linear flow accelerator comprising a flat Venturi connected to the piping network and electromagnets positioned adjacent the flat Venturi. The Venturi has a substantially elliptically shaped internal cross-sectional area and opposing, substantially flat exterior surfaces. The electromagnets are disposed adjacent the substantially flat exterior surfaces and exert a force on the two-phase mixture in the direction of the flow.

The accelerated flow stream passes through a laminar flow grid to make the flow laminar as it reaches the bottling system, where the oxygenated liquid is bottled. Excess oxygenated liquid is collected and circulated back to the ozonator for reprocessing.

These and various other features and advantages that characterize the present invention will become apparent upon reading the following detailed description and upon review of the associated drawings.

BRIEF DESCRIPTION OF THE DRAWINGS

FIG. 5 is a chart showing the oxygen concentration in oxygenated water prepared by the method of the present invention.

DETAILED DESCRIPTION

Figure 1:
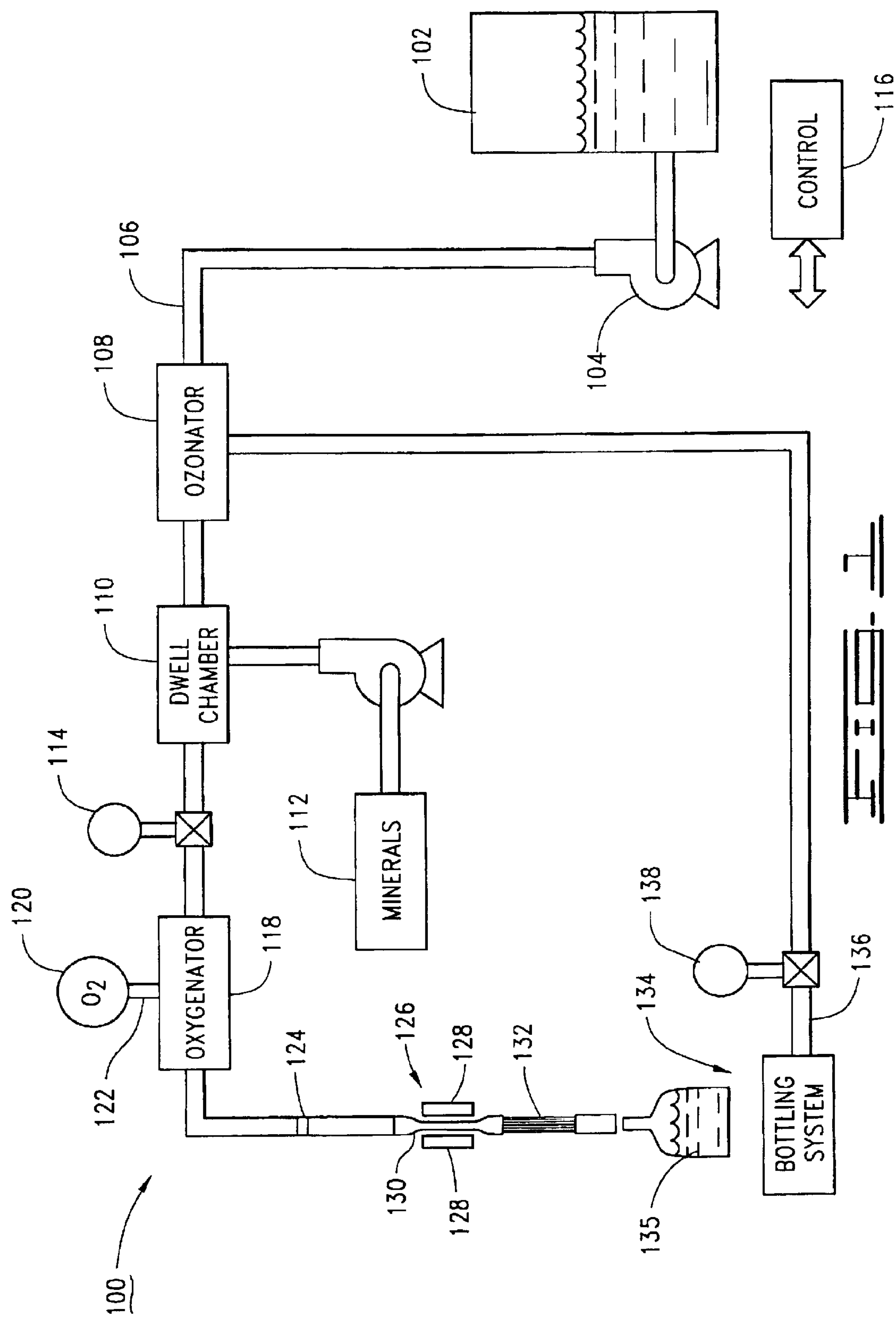
FIG. 1 is a flow schematic showing an oxygenation system for oxygenating a liquid in accordance with an embodiment of the present invention.

FIG. 1 is a schematic diagram showing the flow of liquid through an oxygenation system 100. In one embodiment, the liquid is spring water or mineral water, but other types of drinks, such as sports drinks, may also be used. The flow begins by pumping the liquid from a reservoir 102. The liquid is supplied to a pump 104 and exits the pump 104 at a desired pressure. Although the system 100 has a pump 104 for supplying pressure to the liquid in the piping network 106, it is contemplated that the water may be also supplied from an elevated reservoir so that no additional pressure is required.

After leaving the pump 104, the liquid flows through an ozonator 108 where ozone is generated and injected into the liquid to sterilize the liquid. The ozone destroys bacteria in the liquid and removes odor and harmful organic compounds from the liquid.

The liquid flows from the ozonator 108 to a dwell chamber 110. In the dwell chamber 110, colloidal minerals are injected into the liquid. The colloidal minerals are stored in a mineral reservoir 112 and injected into the dwell chamber 110 by positive displacement pumps. The dwell chamber 110 is sized in relation to the desired flow through the system 100 and the desired rate of mineral injection into the flow.

Colloidal minerals are characterized by having electrostatic adsorption of ions to the surface of a colloidal particle. This adsorption creates a primary adsorption layer that in turn creates a substantial adsorption layer at the surface of the colloidal particle. This surface charge performs two functions: (1) the surface charge causes a repulsion to exist between two particles when they approach each other, and (2) the surface charge attracts oppositely charge ions into the vicinity of the particles. As a result, an ion "cloud" or "double layer" forms in a solution around the charged particles and the ions are dispersed throughout the liquid.

The thickness of this ion cloud determines how close two particles can approach each other before the two particles start exerting repulsive forces on one another. The size of this ion cloud depends on the magnitude of the surface charge which depends on the solution concentration of the adsorption ion and the concentration of the electrolyte in solution. Examples of suitable colloidal minerals include aluminum, sulfur, iron and fluoride.

The liquid that exits the dwell chamber 110 flows through liquid sampling instruments 114. The liquid sampling instruments 114 preferably consist of conventional instrumentation to measure the fluid flow rate, the fluid pressure, and fluid temperature and the instruments communicate this fluid flow information to a control processor 116. The control processor 116 is part of a computer (PC) based control system that regulates the various inputs to the oxygenation system 100 in response to information acquired by the liquid sampling instruments 114.

Downstream of the liquid sampling instruments 114, oxygen ($O_2$) is injected into the flow stream by an oxygen injector 118. The oxygen supplied to the oxygen injector 118 comes from an oxygen tank 120 through an oxygen injection tube 122. Instruments (not shown) on the oxygen injection tube 122 monitor and regulate the amount of oxygen injected into the flow stream and communicate this information to the control processor 116.

After oxygen is injected into the flow stream, the flow stream constitutes a two-phase flow stream made up of a mixture of liquid, colloidal minerals and gaseous oxygen in the form of gas bubbles. Downstream of the oxygen injector 118, the two-phase mixture passes through a dispersal grid 124. The dispersal grid 124 is preferably a stainless steel wire mesh. The dispersal grid 124 causes the oxygen bubbles to become evenly distributed throughout the flow stream and causes the oxygen bubbles to become more uniform in size.

The two-phase mixture then flows through a linear flow accelerator 126. The linear flow accelerator 126 comprises a flat Venturi 128 with electromagnets 130 positioned adjacent the flat Venturi 128. The linear flow accelerator 126 is more fully described below in the description of FIGS. 2–3. The linear flow accelerator 126 accelerates the flow to supersonic speeds. The speed of sound in the two-phase mixture of liquid and oxygen bubbles is on the order of 15 meters per second (50 feet per second), although it varies depending on the concentrations of the liquid and oxygen in the mixture. By comparison, the speed of sound in air is about 330 meters per second (1,100 feet per second) and the speed of sound in water is about 1,500 meters per second (5,000 feet per second).

The two-phase flow is decelerated at the exit of the linear flow accelerator 126 to return the flow to subsonic speeds. The supersonic flow decelerates to subsonic flow across a thin region known as a shock wave. The shock wave breaks up the oxygen bubbles into microscopic bubbles to promote mixing of the liquid and gas bubbles.

The subsonic mixture exits the linear flow accelerator 126 and enters the laminar flow grid 132. In one embodiment, the laminar flow grid 132 is a collection of parallel, tightly-packed and thin tubes with each tube having a diameter much less than the length of the tube. An individual tube resembles an ordinary drinking straw. In another embodiment, the laminar flow grid 132 is a block of cylindrical material, such as polyvinylchloride (PVC), with numerous parallel holes defined within the block. The laminar flow grid 132 receives the turbulent flow from the linear flow accelerator 126 and discharges laminar flow.

The flow that exits the laminar flow grid 130 then flows to a bottling system 134 where the oxygenated liquid is placed into bottles (one shown at 135). Excess flow of the liquid is returned to the ozonator by pipe 136. The returned liquid is passed through return liquid instrumentation 138 to measure a flow rate and a temperature of the returned liquid. This information is provided to the control processor 116 to regulate the flow of minerals to the system 100.

Figures 2, 3:
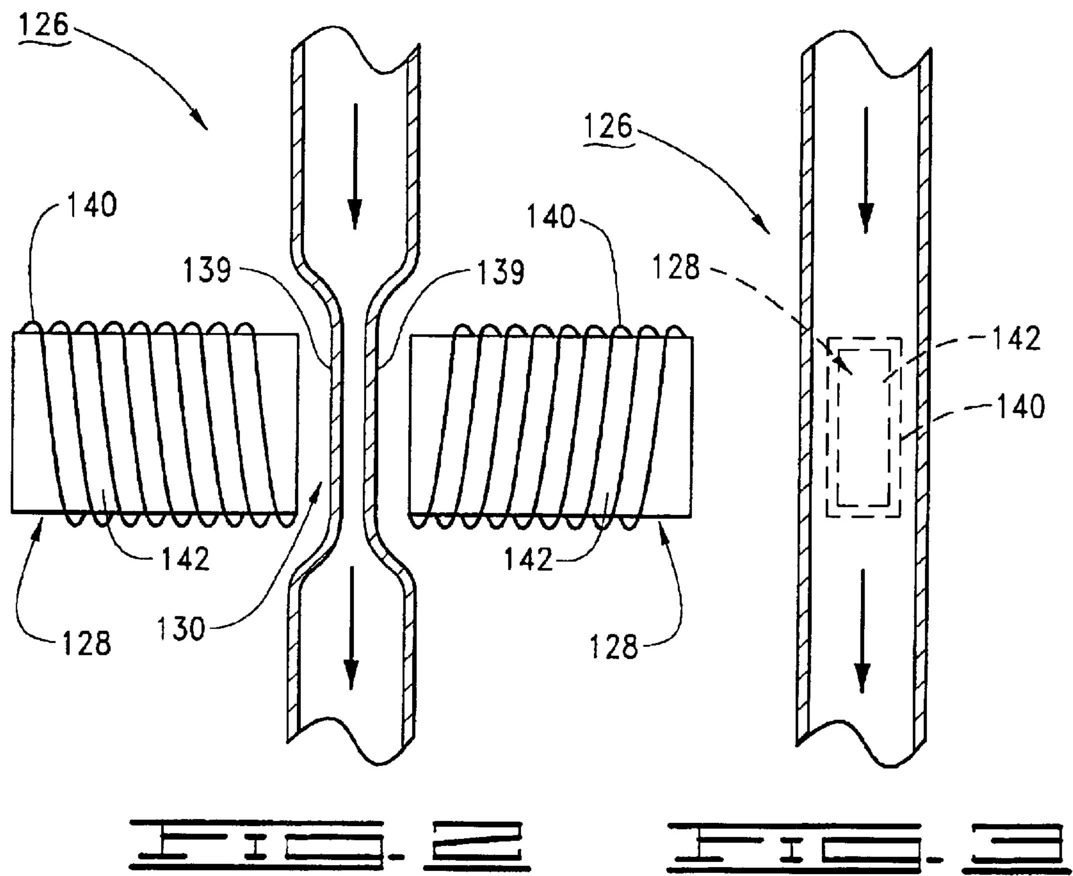
FIG. 2 is a side elevation view of a linear flow accelerator in accordance with an embodiment of the present invention.
FIG. 3 is a front elevation view of a linear flow accelerator in accordance with an embodiment of the present invention.

FIGS. 2 and 3 show a side elevation view and a front elevation view of the linear flow accelerator 126. The linear flow accelerator 126 includes the aforementioned flat Venturi 130 (a converging/diverging nozzle) electromagnets 128. The electromagnets 128 are positioned adjacent opposed flat sides of the flat Venturi 130. The Venturi 130 is formed from a length of cylindrical deformable tubing with opposing flat sides formed over a portion of the length of the Venturi 130, as shown in an end elevation view in FIG. 4. The flow through the Venturi 130 accelerates from a subsonic speed in an entrance region of the Venturi 130 to the speed of sound at a throat of the Venturi 130. The flow continues to accelerate to supersonic speed through the Venturi 130 and then decelerates rapidly across a shock wave formed as the flow exits the Venturi 130. As noted above, the speed of sound for the two-phase mixture of liquid and oxygen is on the order of 15 meters per second (50 ft/sec).

Figure 4:
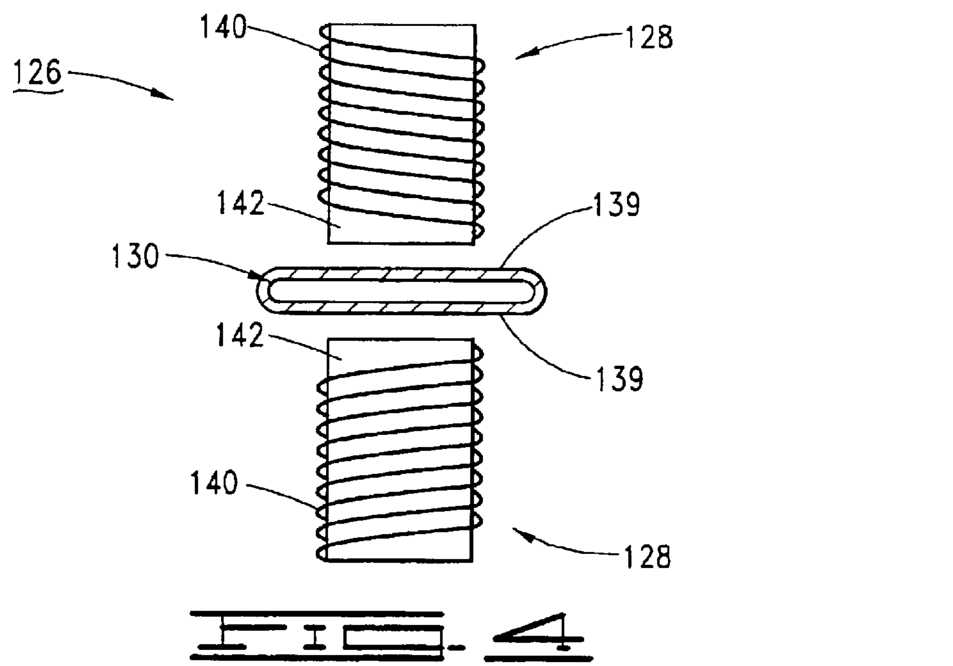
FIG. 4 is an end elevation view of a linear flow accelerator in accordance with an embodiment of the present invention.

The Venturi 130 does not have a conventional axisymmetric configuration, but rather is characterized as flat Venturi, as shown in FIG. 4. More particularly, the Venturi has a substantially elliptically shaped internal cross-sectional area that is smaller than the cross-sectional areas of the passageway immediately upstream and downstream from the Venturi. This particular geometry facilitates placement of the electromagnets adjacent opposing, substantially flat exterior surfaces 139 of the Venturi 130, providing closer, more uniform application of an electromagnetic field across the flow stream within the Venturi.

The electromagnetic field exerts forces on the colloidal minerals in the liquid. The electromagnets 130 are preferably polarized such that the electromagnetic field aligns with the direction of flow (downward in FIG. 2). The strength of the electromagnetic field is determined by the electrical current that flows through coils 140 wrapped around a core 142 of the electromagnet.

It has been observed that the electromagnets 130 cause the flow deceleration across a stronger shock wave than would otherwise be present for the flat Venturi 128 alone. The stronger shock wave in turn causes the resultant microscopic bubbles downstream of the shock wave to be smaller and causes better mixing of the fluid and oxygen. The reduction in size of the bubbles also causes the liquid-gas boundary to be larger and promotes greater mass transfer of the oxygen into the liquid. It is also believed that the flow in the linear flow accelerator 126 advantageously increases the Zeta potential of the mixture of liquid and oxygen gas.

EXAMPLE

A prototype system 100 conforming to that shown in FIG. 1 was built for the oxygenation of spring water. The spring water was filtered to 5 microns ($5\times10^{-6}$ meter) and presented with the following nominal characteristics:

Total dissolved solids=26–30 parts per million;

pH=6.1;

Initial dissolved oxygen levels=7.2 milligrams per liter; and

Temperature=14° C. (57° F.).

The liquid pump 104 supplied the spring water to the system at 193 kilopascal (28 psi) at a flow rate of 114 liters per minute (30 gallons per minute). The piping for the piping network 106 between the pump 104 and the linear flow accelerator 126 had a nominal diameter of 3.8 cm (1.5 inches). The ozonator 108 had a volume of 246 liters (65 gallons) and a flow capacity of 132 liters per minute (35 gallons per minute).

The colloidal minerals used were produced by The Rockland Corporation, Tulsa, Okla., United States of America, under the trademark Body Booster. These minerals are derived from humnic shale and consist of approximately 72 identified compounds including sulfur, aluminum, fluoride, iron, calcium and carbon.

The oxygen was supplied to the water by the oxygenator 118 at a pressure of 227 kilopascals (33 psi) or about 34 kilopascals (5 psi) greater than the water pressure. The holes in the dispersal grid 124 were approximately 1.6 millimeters (1/16th of an inch) in diameter.

The flat Venturi 130 was created by heating a length of acrylic tubing and then deforming the length of tubing to form opposed flat portions as shown in FIGS. 2 and 4. The undeformed tubing had a nominal inner diameter of about 5.8 cm (2 inches). The deformed length of tubing with a substantially elliptical cross section was about 30.48 cm (12 inches) in length. The flattened surfaces 139 had dimensions of approximately 6.4 cm (2.5 inches) by 0.32 cm (0.125 inches). The electromagnet cores 142 had a dimension of 17.8 cm (7 inches) by 5.1 cm (2 inches).

Tests were performed on the water at times related to the bottling process. An initial test was performed to obtain an "initial" oxygen concentration in the water at the time of bottling. Samples of the bottled oxygenated water were taken to a laboratory for testing. Tests were performed to measure the oxygen concentration immediately after opening each bottle. The bottles were left open to the atmosphere and tested after the passage of 24 hours. The results of these tests for six sample runs under various operating conditions are presented in FIG. 5.

It is readily seen that the oxygen concentration is greatly increased by a factor of about 6–7 by the process described above, as compared to the initial concentration of oxygen in the water. In general, the initial oxygen concentrations varied from about 38 milligrams per liter (mg/l) to about 46 mg/l. These results show the efficiency of the system 100.

It is clear that the present invention is well adapted to attain the ends and advantages mentioned as well as those inherent therein. While presently preferred embodiments of the invention have been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A system for increasing dissolved oxygen levels in a liquid, comprising:

a piping network defining an interior passageway;

a liquid source which introduces a liquid into the piping network to form a flow stream;

a dwell chamber connected to the piping network which injects colloidal minerals at a desired concentration into the flow stream;

an oxygen injector connected to the piping network which injects gaseous oxygen into the flow stream at a desired level;

a linear flow accelerator connected to the piping network to accelerate the flow stream, comprising:

a flat Venturi having a substantially elliptically shaped internal cross sectional area smaller than respective cross sectional areas of the passageway immediately upstream and downstream of the flat Venturi; and an electromagnet adjacent the flat Venturi and aligned along a major axis of the substantially elliptically shaped internal cross sectional area which applies a magnetic field of desired field strength to the flow stream in the flat Venturi, wherein the flow stream is accelerated to supersonic speed through the linear flow accelerator and subsequently decelerated to subsonic speed as the flow stream exits the linear flow accelerator with the transition from supersonic to subsonic speed inducing a shock wave in the flow stream to break up oxygen bubbles in the liquid; and a laminar flow grid connected to the piping network downstream from the linear flow accelerator to remove turbulence from the flow stream.

2. The system of claim 1 wherein a positive displacement pump injects the colloidal minerals into the liquid in the dwell chamber.

3. The system of claim 1 further comprising a bottling system connected to the piping network downstream from the laminar flow grid which places the liquid in bottles.

4. The system of claim 1 further comprising a dispersal grid connected to the piping network between the oxygen injector and the linear flow accelerator to nominally uniformly distribute oxygen bubbles throughout the flow stream.

5. The system of claim 1 further comprising an ozonator connected to the piping network upstream from the oxygenator to inject ozone into the flow stream to sterilize the liquid.

6. The system of claim 1 wherein the flat Venturi further has opposing, substantially flat exterior surfaces aligned with the major axis of the substantially elliptically shaped internal cross-sectional area, and wherein the electromagnet is disposed adjacent a selected one of the flat exterior surfaces.

7. The system of claim 6 wherein the flat Venturi is formed by providing a length of tubing with a substantially circular shaped internal cross-sectional area, and selectively deforming the length of tubing to produce the substantially elliptically shaped internal cross-sectional area and the substantially flat exterior surfaces.

8. A method for producing oxygenated liquid, comprising:

(a) introducing a pressurized liquid into a piping network to form a flow stream;

(b) adding colloidal minerals at a desired concentration to the flow stream;

(c) injecting gaseous oxygen into the flow stream to produce a flowing mixture of liquid and gaseous oxygen bubbles;

(d) providing a linear flow accelerator including a flat Venturi having a substantially elliptically shaped internal cross sectional area and an electromagnet adjacent the flat Venturi and aligned along a major axis of the substantially elliptically shaped internal cross sectional area which applies a magnetic field of desired field strength across the flat Venturi; and (e) passing the flowing mixture of liquid and gaseous oxygen bubbles through the linear flow accelerator to accelerate the flowing mixture to supersonic speed and to subsequently decelerate the flowing mixture to subsonic speed to break up the gaseous oxygen bubbles.

9. The method of claim 8, further comprising a step of providing a dispersal grid upstream from the linear flow accelerator to nominally uniformly distribute oxygen bubbles throughout the flow stream.

10. The method of claim 8, further comprising a step of providing a laminar flow grid downstream from the linear flow accelerator to remove turbulence from the flowing mixture exiting the linear flow accelerator.

* * * * *